United States Patent
Pappa et al.

(10) Patent No.: US 7,287,933 B2
(45) Date of Patent: Oct. 30, 2007

(54) PROCESS FOR THE REMEDIATION OF SOIL POLLUTED BY ORGANIC COMPOUNDS

(75) Inventors: Rosario Pappa, Monterotondo (IT); Felicia Massetti, Castelnuovo di Porto (IT); Edoardo D'Angeli, Viale della Bella Villa (IT); Aldo Imerito, Rome (IT)

(73) Assignees: Ecotec S.r.l., Siracusa (IT); Enitecnologie S.p.A., San Donato Milanese (IT)

( * ) Notice: Subject to any disclaimer, the term of this patent is extended or adjusted under 35 U.S.C. 154(b) by 226 days.

(21) Appl. No.: 10/481,413

(22) PCT Filed: Jul. 4, 2002

(86) PCT No.: PCT/EP02/07495

§ 371 (c)(1),
(2), (4) Date: Jun. 2, 2004

(87) PCT Pub. No.: WO03/004184

PCT Pub. Date: Jan. 16, 2003

(65) Prior Publication Data

US 2004/0204624 A1    Oct. 14, 2004

(30) Foreign Application Priority Data

Jul. 6, 2001  (IT)  ............................ MI2001A1439

(51) Int. Cl.
   B09C 1/08   (2006.01)
   B01D 10/04  (2006.01)
   B08B 3/04   (2006.01)
   C02F 1/26   (2006.01)

(52) U.S. Cl. ........................ 405/128.5; 134/12; 588/261
(58) Field of Classification Search ................ 588/261; 210/634; 134/12; 405/128.5
   See application file for complete search history.

(56) References Cited

U.S. PATENT DOCUMENTS

| 5,055,196 A | * | 10/1991 | Darian et al. ................ 210/638 |
| 5,585,002 A | | 12/1996 | Nardella et al. |
| 5,779,813 A | | 7/1998 | Plunkett |
| 5,986,147 A | * | 11/1999 | Plunkett ..................... 568/678 |

FOREIGN PATENT DOCUMENTS

| EP | 0 934 780 | 8/1999 |
| EP | 934 780 | 8/1999 |
| WO | 99 20409 | 4/1999 |
| WO | 99/20409 | 4/1999 |

* cited by examiner

Primary Examiner—Wayne A. Langel
Assistant Examiner—James Fiorito
(74) Attorney, Agent, or Firm—Oblon, Spivak, McClelland, Maier & Neustadt, P.C.

(57) ABSTRACT

An improved process is described for the removal of organic pollutants from soil by extraction with a lipophylic solvent, wherein the improvement consists in the fact that the purified soil is treated with water to remove the residual solvent. This process allows the residual solvent to be completely removed from the purified soil enabling it to be re-inserted into the environment, with a low energy consumption and a greater guarante of safety in the running of the plant.

11 Claims, 1 Drawing Sheet

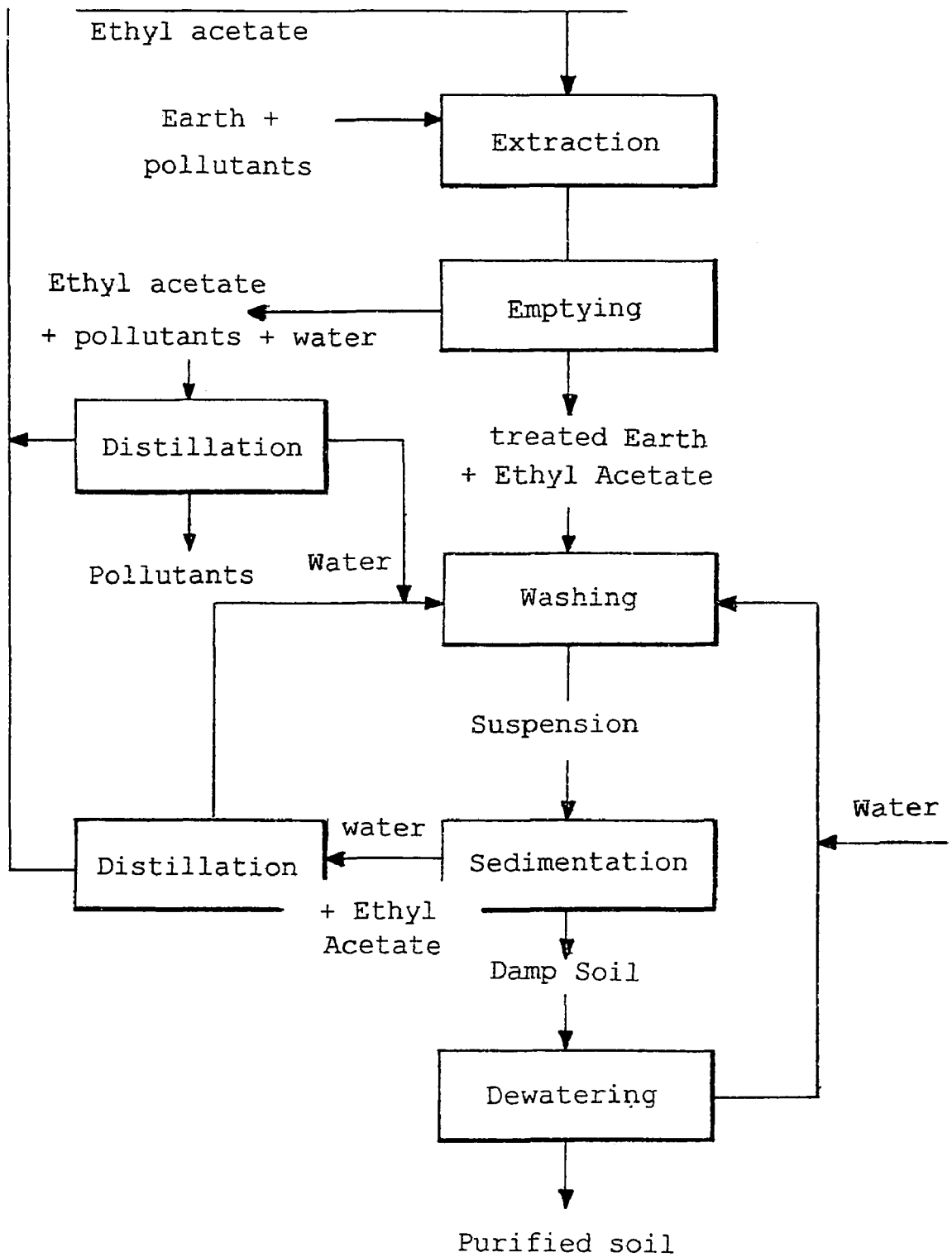

PROCESS FOR THE REMEDIATION OF SOIL POLLUTED BY ORGANIC COMPOUNDS

The present invention relates to a process for the remediation of soil polluted by organic compounds.

In particular, the present invention relates to an improved process for the removal of organic pollutants from soil by extraction with a lipophylic solvent, wherein the improvement consists in the fact that the purified soil is treated with water to remove the residual solvent.

The problem of soil contaminated by organic pollutants such as hydrocarbons, polynuclear aromatics, organo-chlorinated products is becoming increasingly more dramatic in industrialized countries, not only in terms of interventions on pollution of soil and underground water, but also due to the necessity of recovering areas for possible industrial and civil use. Another problem, which is typical of the oil industry, is the treatment of drill cuttings before being discharged into the sea.

There are many sources of pollution and various characteristics of the ground subject to pollution. These circumstances make it necessary to avail of a wide range of possible solutions.

The technologies generally adopted for the treatment of soil are: soil washing, bioremediation and solidification/stabilization.

The term soil-washing refers to washing techniques which use water, optionally containing surfactants.

Soil washing exploits the tendency of pollutants to bind themselves, either chemically or physically, to the finer particles of the sediment. These particles can be separated from the rest of the matrix by means of a more or less complex series of separation operations based on differences in dimensions, density and surface properties. With this technology the separation is obtained of a fine polluted fraction and a coarse decontaminated fraction.

The finer particles thus separated, only represent a small fraction of the initial polluted volume, but contain most of the pollutants.

Soil washing is an emerging technology adopted in numerous situations for reducing the quantity of dangerous material to be deposited in dumps and recovering part of the treatment costs by the selling of the coarser fraction produced as building material.

This process however has substantial disadvantages deriving from the necessity of operating with large volumes of extracting agent and the difficulty of recovering the additives used.

Biological remediation techniques are limited to biodegradable compounds and non-toxic concentrations and are greatly jeopardized by the long times necessary for completing the remediation.

Solidification/stabilization processes consist in adding a hydraulic ligand to the sediment, for example Portland cement. In this way the pollutants are physically blocked inside the cementitious matrix and can no longer migrate into the surrounding environment.

In some processes, in addition to cement, specific additives are added, capable of reacting with the pollutants transforming them into less toxic or less mobile species.

This type of technology has the disadvantage of producing an increase in the volume of the material treated (sediment+ligand) and, in any case, does not guarantee the stability of the end-product over the time.

Treatment processes based on extraction with a solvent selected, for example, from methylene chloride, liquefied $C_2$-$C_4$ hydrocarbons, or supercritical fluids, are also known in the art.

The applicability and efficiency of these processes however is greatly limited by the presence of high percentages of fine particles and by the high water content which generally characterize some types of soil.

In order to overcome these disadvantages, processes have been proposed in the art, for the remediation of soil having a high water content, which are based on the use of an extracting mixture consisting of a solvent-cosolvent couple in such proportions as to form a single phase with the water contained in the ground (U.S. Pat. No. 5,585,002) or a single solvent, preferably ethyl acetate (IT 1,298,543).

In particular, according to these processes, the soil, after extraction with the organic solvent and decanting, are subjected to drying to remove the residual solvent which is present in a quantity generally ranging from 3 to 10%.

For this purpose, equipment is used, which, for reasons of safety associated with the flammability of the solvent and to reduce emissions into the environment, must be inertized with nitrogen and provided with suitable powder-capturing systems. Furthermore, due to the low exchange coefficient of the ground, this equipment requires a considerable thermal exchange surface, a high duty and high temperatures which can cause alterations in the pedologic characteristics of the ground, jeopardizing the possibility of re-insertion in the original site.

It has now been found that by treating the soil, after extraction with a solvent and decanting, with a sufficient quantity of water for dissolving the residual solvent, it is possible to separate from the dispersion thus formed, a surnatant aqueous phase, containing the solvent, and a solid sedimented phase in which the residual solvent is reduced to a minimum concentration which is such as to allow re-insertion in the environment.

The solvent contained in the above aqueous phase can be recovered by simple evaporation and with a lower energy consumption, as it is no longer necessary to heat the whole mass of soil.

In accordance with this, an objective of the present invention relates to a process for the removal of organic pollutants from soil containing water in a quantity ranging from 10% to the saturation limit of the field, which comprises the following steps:

(a) mixing of the soil with a lipophylic solvent;

(b) removal by decanting or separation of a liquid phase, containing the pollutants and solvent, from a solid phase consisting of the treated soil;

(c) recovery of the solvent from the liquid phase obtained in step (b) by distillation and recirculation in step (a);

(d) mixing of the solid phase separated in step (c) with water in a ratio which is such as to completely dissolve the residual solvent;

(e) separation by decanting of a solid fraction, consisting of the washed soil, and an aqueous phase saturated with solvent;

(f) dewatering of the solid fraction obtained in step (e); and (g) recovery of the solvent from the aqueous phase by evaporation and recycling to step (a).

Various kinds of soil can be used in the process and with different pedologic characteristics, with both a high sandy and slime-clay component. It is important to control that the water content present in the ground to be recovered is close to its field capacity. In the case of ground with a lower humidity content, the material should be dampened before treatment.

With the process described, clay-type or medium mixture soil is typically treated, with a content of 10 to 50% (with respect to the dry weight) of particles having a particle-size of less than 63 µm and a water content ranging from 10 to 60% by weight.

In step (a), the weight ratio solvent/soil ranges from 0.2 to 5.0, preferably from 0.5 to 1. In a process operating in continuous, the countercurrent flow-rate ratio solvent/soil ranges from 0.2 to 0.5.

This step is generally carried out at room temperature, for a time ranging from 10 to 120 minutes.

The solvents used in the process according to the present invention are selected so as to be non-toxic and volatile, inexpensive and easily available.

Examples of lipophylic solvents suitable for the purposes of the present invention are ethyl acetate and petroleum ether. Among lipophylic solvents, ethyl acetate is preferred for the purposes of the invention.

Steps (a) to (e) of the process according to the present invention can be repeated several times, if necessary.

The extraction with a solvent according to step (a) can be carried out with a batch or continuous process. In the former case, the equipment consists of an industrial mixing system such as a plough, blade or rotating drum mixer, into which the quantity of earth to be treated is charged, together with the solvent, mixing for the period of time necessary for obtaining the extraction of the pollutants.

In the case of a continuous running of the process, the extraction equipment can consist of a screw system in which the solvent and earth are conveyed in countercurrent. The last screw separates the earth from most of the solvent.

The separation according to step (b) takes place instantaneously after the mixing has been stopped due to the fact that the fine fraction in the soil is kept in an agglomerated form from the water and only a minimum part passes into the extraction solvent.

In this way, a soil is obtained, purified from pollutants, consisting of both the coarse fraction and fine fraction, containing 3-10% of residual solvent and a liquid fraction containing the pollutants.

In step (c) of the process according to the present invention, the solid phase is washed with water to allow the recovery of the residual extraction solvent, which has a solubility in water of 8.7% (v/v); the solvent thus recovered can be recycled to step (a) of the process according to the present invention.

In the case of a batch process, the washing with water can be carried out in the same equipment used for the extraction in step (a), by feeding water to the system after separating the solvent by decanting. Using a continuous process, the washing with water can be effected in a suitable mixer or in an additional screw in which the earth and water are fed in countercurrent.

In both cases, it is not necessary to pressurize the apparatus with inert gas and no powders are formed, as the material is dispersed in water.

In step (e) of the process according to the present invention, after decanting a solid fraction is separated, consisting of the washed soil, and an aqueous fraction saturated with solvent. The solid fraction thus obtained is then subjected to dewatering, using equipment known in the art, such as belt-pressing, centrifugation.

The recovery of the exhausted solvent (step g) can be effected using a thin film evaporator with scraped walls operating at atmospheric pressure or under slight depression, obtaining a boiler residue containing the fraction extracted from the soil and minimum quantities of water and a stream at the head consisting of the extraction solvent according to step (a).

Alternatively, said recovery can be effected by distillation in the presence of water, obtaining a boiler residue consisting of water and pollutants, which can be separated by decanting, and a stream at the head consisting of the extraction solvent according to step (a).

The process according to the present invention allows the pollutants to be removed from soil with high water contents and fine particles in a simple and economic way.

FIG. 1 indicates the block scheme of the process according to the present invention.

The following examples are illustrative but do not limit the scope of the invention in any way.

EXAMPLE 1

A sample of soil removed from a site polluted by hydrocarbons has the following characteristics:

pH in aqueous solution=7.02; in KCl 1N=7.34

Humidity content: 18.3%

Conductivity: 1.14 mS/cm

Saline concentration: 6.76 mEq/100 g

Total hydrocarbons (Total Petroleum Hydrocarbons—TPH) 18,000 ppm (gas chromatographic determination)

Agronomic characterization: Gravel 46.3%, Sand 42.4%, clay 11.3%.

A kilogram of this earth are placed in a rotating cylinder together with 1 kg of ethyl acetate and maintained under stirring, at room temperature, for 30 minutes.

After the mixture has been left to settle for 5 minutes, the liquid phase is filtered on a Teflon filter with 0.45 micron pores, in order to determine, by weighing, the fine fraction of the soil entrained by the solvent, which amounts to 0.7% by weight of earth.

The ethyl acetate is recovered from the liquid fraction by distillation in a rotating evaporator at 90° C.

940 g of solvent are recovered, which, with the addition of a further 60 g of fresh ethyl acetate are used for a second washing cycle of the earth.

The solvent recovered after this second cycle amounts to 1 kg.

Water (1 kg) is added, in the same rotating drum, to the earth, containing 60 g of residual ethyl acetate, which is sufficient to dissolve the quantity of residual solvent, it being known that the solubility of ethyl acetate in water is equal to 8.7% (v/v).

After 10 minutes of stirring, the mixture is left to settle for 30 minutes. The upper aqueous layer is separated and preserved. The dispersion of earth in water remaining on the bottom is centrifuged at 3,000×G, recovering a solid fraction consisting of purified earth in which the concentration of Total Petroleum Hydrocarbons (TPH) amounts to 180 ppm, within the limits established by the Laws in force.

The aqueous phase obtained from the centrifugation, joined to that put aside after the sedimentation, is heated to 90° C. in a rotating evaporator, recovering the ethyl acetate dissolved.

EXAMPLE 2 (COMPARATIVE)

A 1 kg sample of soil having the characteristics indicated in Example 1, is dried in the air for 48 hours to reduce the humidity content to 3.2% and then treated as described in Example 1.

The entrainment into the solvent of 65 g of the fine fraction of the sample, is observed. This dispersion remains stable for various hours, making it necessary to effect centrifugation to separate the solid from the liquid.

The solvent recovered by distillation is used for a second washing of the soil. After the second centrifugation, the two fine fractions of the soil are joined to the coarse fraction and dried in the air for 24 hours.

The concentration of TPH after the second treatment amounts to 1670 ppm, which is a value higher than the maximum limit of 750 ppm indicated by the Law for re-use of the site (Official Bulletin of the Region of Tuscany nr. 36 of Jun. 16, 1993).

EXAMPLE 3

A sample of soil is dried as in Example 2 and water is then added so as to bring the humidity content to 18%.

After the treatment as described in Example 1, it is observed that the solvent, obtained by simple decanting, contains less than 0.7% of fine fraction.

An analysis of the TPH indicates a residual concentration of 183 ppm, a value which confirms the results of Example 1, both in terms of ground remediation and simplicity of the recovery operations of the solvent.

The recovery of the solvent, on summing the quantity obtained by decanting after the extraction treatment of the pollutants and separation by distillation and by distillation of the residue in the washing aqueous phase of the soil, proved to be practically quantitative.

The invention claimed is:

1. A process for the removal of organic pollutants from soil characterized by a water content ranging from 10% to the saturation limit of the soil, which comprises:
   (a) mixing of the soil with a lipophylic solvent;
   (b) removal by decanting or separation of a liquid phase, containing the pollutants and solvent, from a solid phase consisting of the treated soil;
   (c) recovery of the solvent from the liquid phase obtained in step (b) by distillation and recirculation in step (a);
   (d) mixing of the solid phase separated in step (c) with water in a ratio which is such as to completely dissolve the residual solvent;
   (e) separation by decanting of a solid fraction, wherein the solid fraction comprises the soil which was washed by the water in (d), and an aqueous phase saturated with solvent;
   (f) dewatering of the solid fraction obtained in step (e); and
   (g) recovery of the solvent from the aqueous phase by evaporation and recycling to step (a).

2. The process according to claim 1, wherein the lipophylic solvent is ethyl acetate.

3. The process according to claim 1, wherein the weight ratio between the lipophylic solvent and the soil ranges from 0.2 to 5.0.

4. The process according to claim 3, wherein the weight ratio between the lipophylic solvent and the soil ranges from 0.5 to 1.

5. The process according to claim 1, wherein in step (a) the mixing of the components is carried out at room temperature, for a time ranging from 10 to 60 minutes.

6. The process according to claim 1, wherein the separation in step (b) takes place by decanting of the liquid.

7. The process according to claim 1, wherein the recovery of the solvent in step (g) is carried out with a thin film evaporator with scraping walls operating at atmospheric pressure or under slight depression or by distillation in the presence of water.

8. The process according to claim 1, wherein the solvent recovered in step (d) is recycled to step (a).

9. The process according to claim 1, wherein steps (a) to (e) can be repeated several times.

10. The process according to claim 1, wherein the organic pollutants arc aliphatic and aromatic hydrocarbons, polynuclear aromatic hydrocarbons, aliphatic and aromatic organo-chlorinated products, pesticides, dioxins and dibenzofurans.

11. The process according to claim 1, which is carried out batchwise or in continuous fashion.

* * * * *